(12) United States Patent
Meyer

(10) Patent No.: US 10,131,024 B2
(45) Date of Patent: Nov. 20, 2018

(54) ROTATABLE INTERCHANGEABLE WORK SURFACE MOUNT

(71) Applicant: Jonyt Meyer, Humble, TX (US)

(72) Inventor: Jonyt Meyer, Humble, TX (US)

( * ) Notice: Subject to any disclaimer, the term of this patent is extended or adjusted under 35 U.S.C. 154(b) by 955 days.

(21) Appl. No.: 14/256,684

(22) Filed: Apr. 18, 2014

(65) Prior Publication Data

US 2014/0312549 A1 Oct. 23, 2014

Related U.S. Application Data

(60) Provisional application No. 61/813,534, filed on Apr. 18, 2013.

(51) Int. Cl.
*B23Q 3/04* (2006.01)

(52) U.S. Cl.
CPC ........... *B23Q 3/04* (2013.01); *Y10T 29/49998* (2015.01)

(58) Field of Classification Search
CPC ....................................................... B23C 1/06
USPC ............. 269/58, 289 R; 409/160; 248/125.1; 108/106
See application file for complete search history.

(56) References Cited

U.S. PATENT DOCUMENTS

| | | | |
|---|---|---|---|
| 54,248 A * | 4/1866 | Eddy et al. | B23Q 1/28 144/96 |
| 361,105 A | 4/1887 | Winchell | |
| 1,061,622 A | 5/1913 | Mellon | |
| 1,305,321 A | 6/1919 | Tooker | |
| 2,524,969 A * | 10/1950 | Fairchild | B23K 37/0426 269/1 |
| 2,756,377 A * | 7/1956 | Litzman | B23Q 15/22 235/61 PM |
| 3,083,004 A | 3/1963 | Clark | |
| 3,182,989 A | 5/1965 | Colbert | |
| 4,445,678 A * | 5/1984 | George | B23Q 3/104 269/282 |
| 5,020,945 A | 6/1991 | Becker | |
| 5,400,844 A | 3/1995 | Pollock | |
| 5,547,319 A * | 8/1996 | Pollak | B23Q 1/4885 403/366 |
| 5,906,284 A * | 5/1999 | Hammerstrom | B25H 1/02 211/107 |
| 5,918,867 A | 6/1999 | Goodyear | |
| 6,530,740 B2 * | 3/2003 | Kim | B62B 1/002 180/251 |
| 6,688,350 B2 | 2/2004 | Heinlen et al. | |
| 7,677,283 B2 | 3/2010 | Hooker | |
| 7,857,556 B1 | 12/2010 | Staczek | |
| 8,087,855 B1 | 1/2012 | Staczek | |
| 8,118,291 B2 | 2/2012 | Nuchter et al. | |
| 2005/0077668 A1 | 4/2005 | Clouse | |
| 2010/0232896 A1 | 9/2010 | Brown et al. | |

(Continued)

FOREIGN PATENT DOCUMENTS

FR 564281 3/1923

*Primary Examiner* — Joseph J Hail
*Assistant Examiner* — Brian D Keller
(74) *Attorney, Agent, or Firm* — Daniel N. Lundeen; Lundeen & Lundeen PLLC

(57) ABSTRACT

An assembly which provides a rotating work surface extension. The assembly may be attached or fixed to an existing work space platform. An assembly comprising interchangeable rotating work surface extensions is disclosed, along with a system comprising such an assembly and a method of positioning a workpiece utilizing such an assembly.

15 Claims, 19 Drawing Sheets

(56) References Cited

U.S. PATENT DOCUMENTS

2012/0312197 A1 12/2012 Bresette
2012/0321373 A1* 12/2012 Chang ............... B62K 25/02
403/106

* cited by examiner

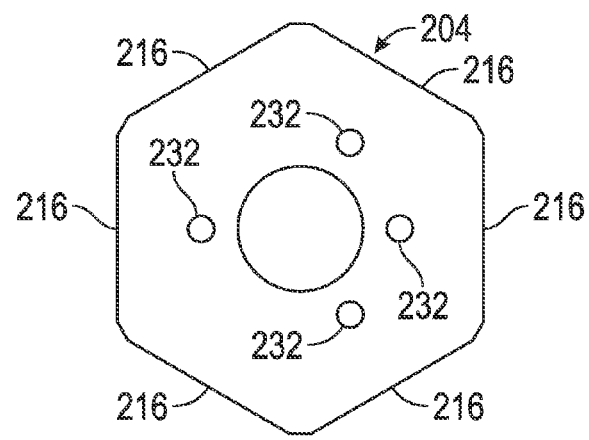
FIG. 17
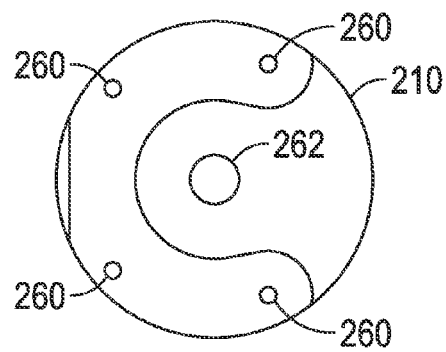
FIG. 18A
FIG. 18B
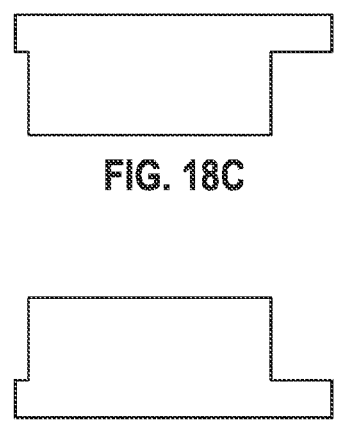
FIG. 18C
FIG. 18D
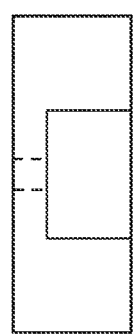
FIG. 18E

ROTATABLE INTERCHANGEABLE WORK SURFACE MOUNT

CROSS REFERENCE TO RELATED APPLICATIONS

This application claims priority benefit to U.S. Provisional Application No. 61/813,534, filed Apr. 18, 2013, which is hereby incorporated by reference herein.

BACKGROUND

The statements in this section merely provide background information related to the present disclosure and may not constitute prior art.

This invention relates to a work surface mount. Worktables are typically planer surfaces. When a cylindrical or odd shaped workpiece is machined, augmented, or otherwise worked on, any number of specialized tooling may be required to support the workpiece. In addition, various power tools may be required for a particular application, requiring removal of the specialized tooling and/or power tools from the worktable between steps. This mode of operation is time consuming and inefficient. The alternative is a plurality of specialized work surfaces, which is costly and often an inefficient use of space, resulting in an overall need in the art.

SUMMARY

In an embodiment, the assembly provides a plurality of rotating work surfaces attachable to a power tool or workbench. The assembly may be attached or fixed to an existing work space platform, such as a work bench, a positioning mount of a power tool table, or the like. In an embodiment, the assembly may introduce a new independent appliance to a surface, or may extend the functionality of an existing surface. The assembly may comprise interchangeable carriers relesably attachable to a mounted support, each of the carriers comprising a plurality of work surfaces.

In an embodiment, an assembly comprises a plurality of work surfaces radially arranged about and releasably attached to a carrier at a plurality of attachment points; the carrier releasably engaged with and rotatable about a horizontal support mountable to a positioning mount slidably engaged with a vertical support.

In an embodiment, a motor assisted lift comprises an electric motor dimensioned and arranged to attach to a positioning mount movably engaged about a vertical support, the electric motor coupleable to an input shaft of the positioning mount such that activation of the electric motor causes the positioning mount to move vertically along the vertical support.

In another embodiment, a system comprises an assembly comprising a plurality of carriers, each carrier comprising a plurality of work surfaces radially arranged about and releasibly attached to the carrier at a plurality of attachment points; each carrier releasably engagable with, and rotatable about a horizontal support mountable to a vertical support.

In an embodiment, a method of positioning a workpiece comprises providing an assembly comprising a plurality of work surfaces radially arranged about and releasibly attached to the carrier at a plurality of attachment points; the carrier releasably engaged with and rotatable about a horizontal support mounted on and perpendicular to a vertical support; and disposing the workpiece on the work surface.

BRIEF DESCRIPTION OF THE DRAWINGS

FIG. 17 shows a frontal view of a mounting plate according to an embodiment;

FIG. 18A shows a top view of a mounting adapter according to an embodiment;

FIG. 18B shows a top view of the mounting adapter shown in FIG. 18A;

FIG. 18C shows a right side view of the mounting adapter shown in FIG. 18A;

FIG. 18D shows a left side view of the mounting adapter shown in FIG. 18A;

FIG. 18E shows a bottom view of the mounting adapter shown in FIG. 18A;

DETAILED DESCRIPTION

Figure 1:
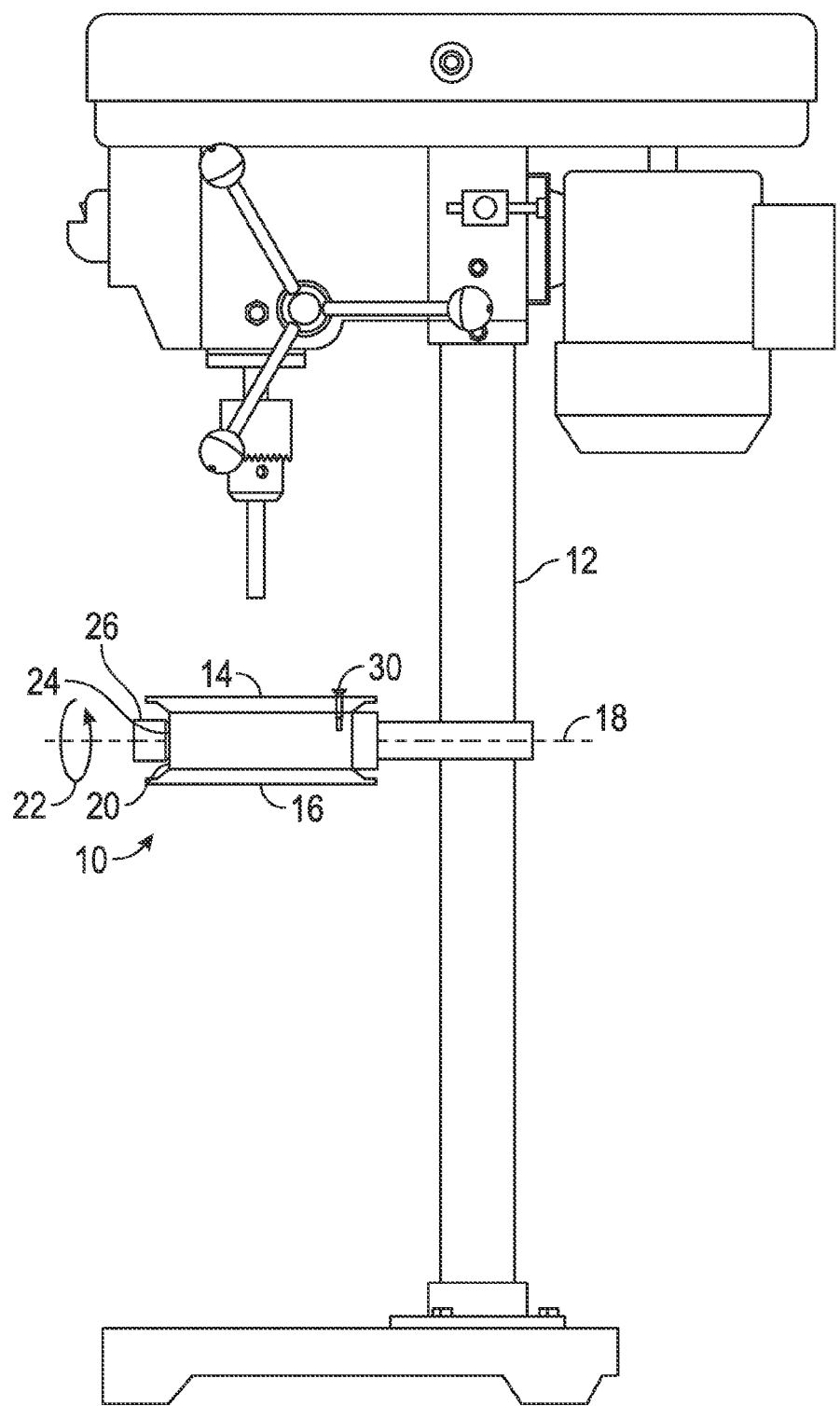
FIG. 1 shows a side view of an embodiment of the assembly mounted to a drill press.

At the outset, it should be noted that in the development of any such actual embodiment, numerous implementation-specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. In the summary and this detailed description, each numerical value should be read once as modified by the term "about" (unless already expressly so modified), and then read again as not so modified unless otherwise indicated in context. As used in the specification and claims, "near" is inclusive of "at."

In an embodiment, an assembly comprises a plurality of work surfaces radially arranged about and releasably attached to the carrier at a plurality of attachment points; the carrier releasably engaged with and rotatable about a horizontal support mountable to a positioning mount slidably engaged with a vertical support.

In embodiments, the carrier comprises a sleeve assembly disposed about and releasably engaged with a horizontal shaft of the horizontal support. In embodiments, the assembly may further comprise a locking mechanism for releasably fixing the position of the carrier relative to the horizontal support. In embodiments, the assembly, mounted to a vertical support, is releasably fixable to the horizontal support such that at least one of the work surfaces is perpendicular to the vertical support. In embodiments, the sleeve assembly comprises an outer end bushing having a central hole through which a threaded member of a locking knob is disposed, wherein a portion of the threaded member of the locking knob is dimensioned and arranged to engage a corresponding threaded recess disposed in an end of the horizontal shaft proximate to the outer end bushing to releasably engage the carrier with the horizontal support.

In embodiments, the vertical support is a support column of a drill press and/or one or more legs of a workbench or other free standing work surface comprising a horizontal top surface. In embodiments, the horizontal support is mountable to the vertical support such that at least one of the work surfaces is positionable to be coplanar with the horizontal top surface.

In embodiments, at least one of the plurality of work surfaces comprises at least one mounting hole, post, slot, groove, or a combination thereof, and/or may comprise at least two work surfaces or at least three work surfaces attached to the carrier and radially arranged about the horizontal support. In embodiments, at least one of the work surfaces comprises one or more tools attached thereto, which may include a tool jaw vise, a pipe vise, a hold down clamp, a chain vise, an angular vise, a three-way tilting vise, a milling vice, a toolmakers vise, an X-Y pivot platform, a power saw, a miter saw, a router, a shaper, a sander, a grinder, a planer, and combinations thereof, generally represented as 28 in FIG. 2.

In embodiments, the carrier comprises a plurality of mounting plates radially arranged about a sleeve rotatably engaged with the horizontal support, each of the mounting plates having a generally polygonal shape comprising at least three outer edges, at least two outer edges of each mounting plate comprising at least one attachment point dimensioned and arranged to attach one of the plurality of work surfaces to the carrier such that each of the work surfaces is attached to the carrier at a plurality of attachment points.

In an embodiment, a motor assisted lift comprises an electric motor dimensioned and arranged to attach to a positioning mount movably engaged about a vertical support, the electric motor coupleable to an input shaft of the positioning mount such that activation of the electric motor causes the positioning mount to move vertically along the vertical support. In embodiments, the motor assisted lift comprises one or more positioning sensors, switches, or a combination thereof, in electrical communication with the electric motor and arranged to control the travel of the positioning mount within a vertical range.

In an embodiment, a system comprises an assembly comprising a plurality of carriers, each carrier comprising a plurality of work surfaces radially arranged about and attached to the carrier; each carrier releasably engagable with and rotatable about a horizontal support mountable to a vertical support. In embodiments, the system further comprises the motor assisted lift comprising an electric motor dimensioned and arranged to attach to a positioning mount movably engaged about the vertical support, the electric motor coupleable to an input shaft of the positioning mount such that activation of the electric motor causes the positioning mount to move vertically along the vertical support.

In an embodiment, a method of positioning a workpiece comprises providing an assembly comprising a plurality of work surfaces radially arranged about and attached to a carrier; the carrier releasably engaged with and rotatable about a horizontal support mounted on a vertical support; and disposing the workpiece on the work surface. In embodiments, the method may further comprise rotating the carrier about the horizontal support and/or engaging a locking pin between the carrier and the horizontal support to fix at least one of the plurality of work surfaces perpendicular to the vertical support.

Turning to FIG. 1, an embodiment of the assembly 10 is shown mounted on a table mount 13 movably mounted on a vertical support 12 (e.g., the support column of a drill press). The assembly comprises a plurality of work surfaces 14 and 16 radially arranged about a central axis 18 of a carrier 20. Carrier 20 is disposed on a horizontal support 24.

Carrier 20 is releasably engaged with horizontal support 24, e.g., via end cap 26, and rotatable 22 about horizontal support 24. In an embodiment, the horizontal support 24 is meant to be semi-permanently mounted or otherwise attached to a vertical support. The rotating carrier 20 and associated work surfaces 14 and 16 form a sub-assembly which may be quickly removed and replaced with another carrier sub-assembly. Accordingly, in an embodiment, a plurality of carriers are interchangeable and can be moved between any of a plurality of suitable horizontal supports according to the instant disclosure.

As shown in FIG. 1, in an embodiment, the carrier sub-assembly can be rotated and locked in place via a clamping or locking mechanism 30, in this embodiment, utilizing one or more locking pins which protrude through the carrier at different points and which engage a portion of the horizontal support to releasably fix the rotational position of the carrier relative to the horizontal support and thus, relative to the vertical support to which the assembly is attached.

Figure 2:
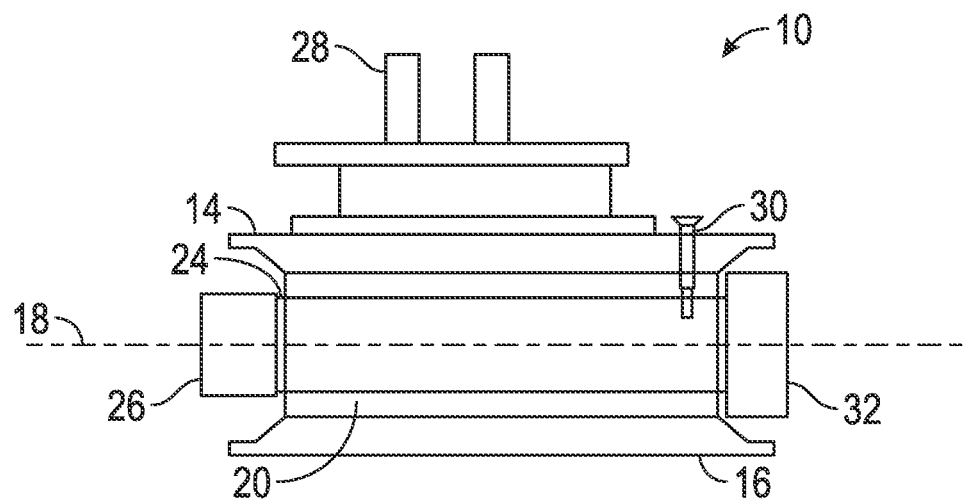
FIG. 2 shows a side view of an embodiment of the assembly.
Figure 3:
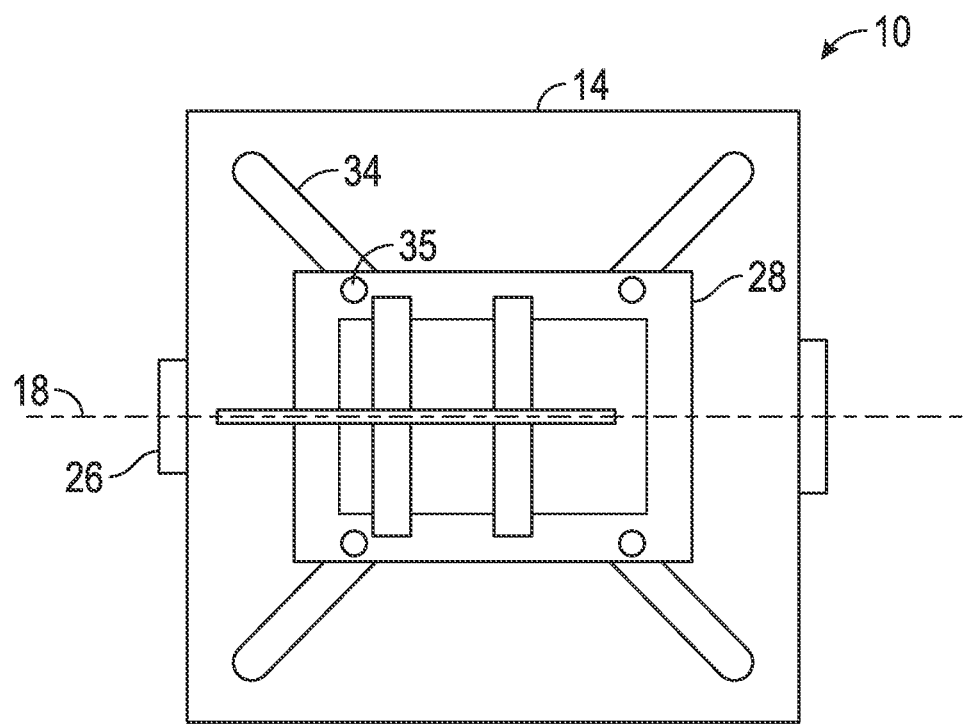
FIG. 3 shows a top view of the embodiment shown in FIG. 2.
Figure 4:
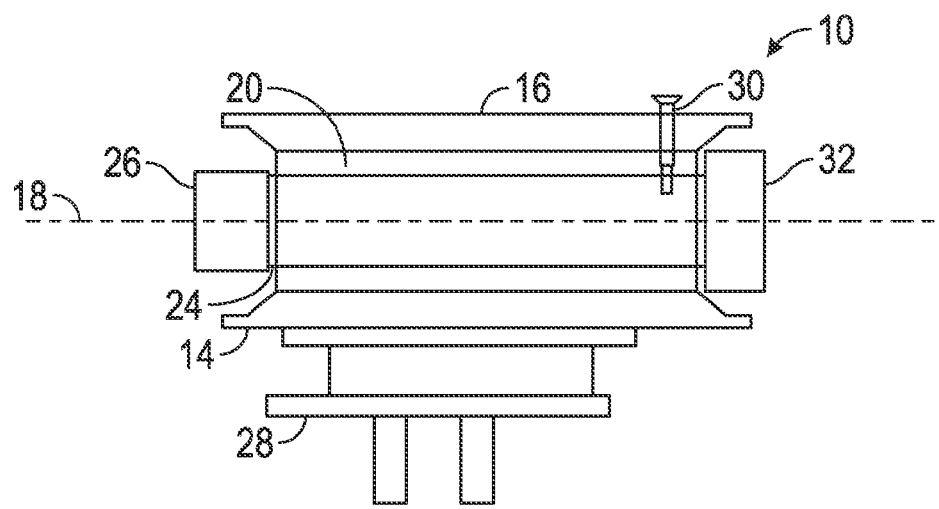
FIG. 4 shows a partial cut-away side view of the embodiment shown in FIG. 2 after rotation of the carrier 180° about the central axis.
Figure 5:
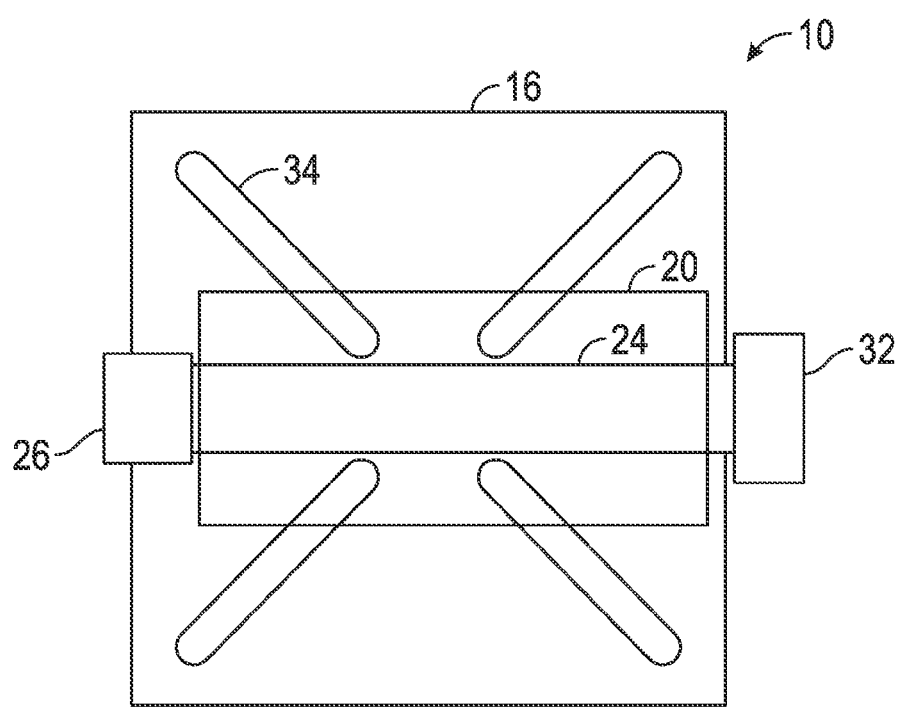
FIG. 5 shows a partial cut-away top view of the embodiment shown in FIG. 4.

FIGS. 2 and 3 show a side view and a top view of an embodiment of the assembly. FIGS. 4 and 5 show a partial cut-away side view and top view of the embodiment shown in FIGS. 2 and 3 after rotation of the carrier 180°. As shown in the figures, in an embodiment, the horizontal support 24 may comprise a mounting bracket 32 to which the horizontal support is attached. In an embodiment, at least one of the plurality of work surfaces comprises at least one mounting hole 34, post 35, slot, or combinations thereof suitable to affix a tool 28 to the work surface 16. As shown in FIG. 2, in an embodiment, the sub-assembly may comprise at least two work surfaces oriented parallel to each other. In an embodiment, one or more of the work surfaces may comprise one or more tools 28 attached thereto.

Figure 6:
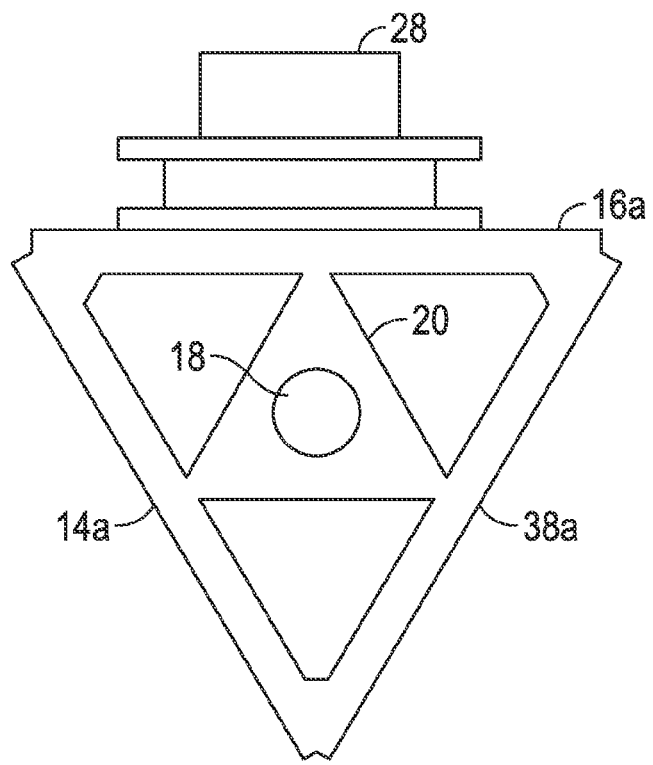
FIG. 6 shows a front view of a carrier and a plurality of work surfaces according to an embodiment.

As shown in FIG. 6, in an embodiment, the sub-assembly comprising the plurality of work surfaces and the carrier 20, may comprise at least three work surfaces (14a, 16a, and 38a) radially arranged about the central axis 18. In an embodiment, the sub-assembly comprises 2, 3, 4, 5, 6, or more work surfaces, each radially arranged about the central axis 18.

Figure 7:
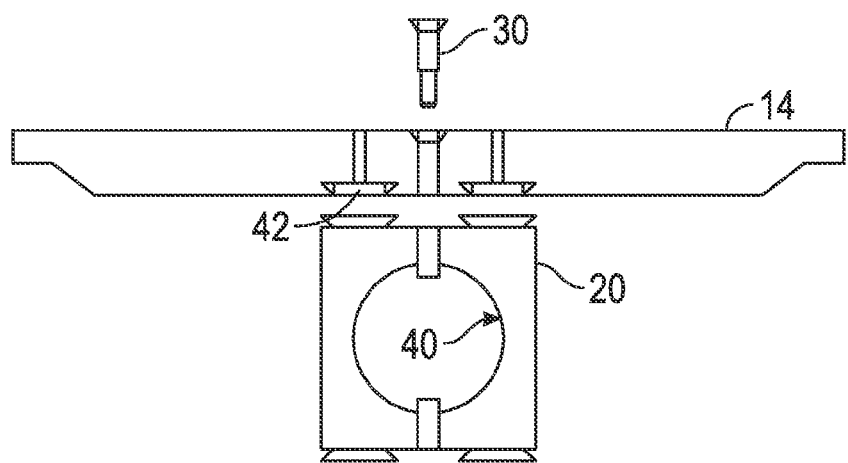
FIG. 7 shows an end-on exploded view of the carrier and a single work surface.
Figure 8:
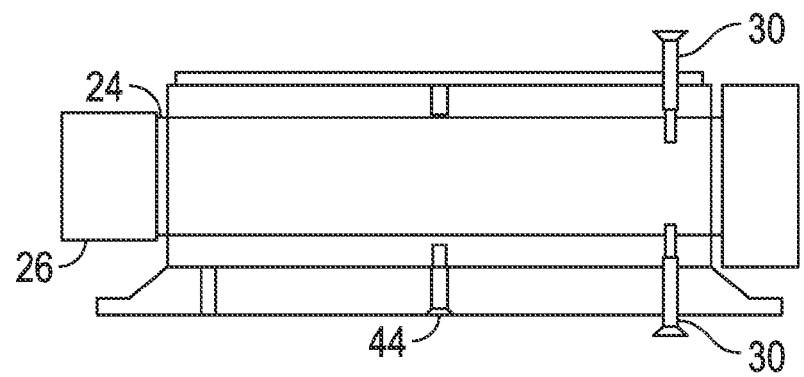
FIG. 8 shows a side view of the embodiment shown in FIG. 7 with the work surface attached to the carrier.

FIG. 7 shows an end-on exploded view of the carrier 20 and a single work surface 14. FIG. 8 shows a side view of the embodiment shown in FIG. 7 with the work surface 14 attached to the carrier 20. In an embodiment, the carrier 20 comprises a sleeve assembly 40 disposed about the central axis which is releasably engagable with a horizontal shaft 24 of the horizontal support. In an embodiment, work surface 14 may be attached to carrier 20 via a tongue and groove system 42, one or more threaded members 44 (FIG. 8), or the like. As shown in FIG. 8, the locking mechanism 30 may be located on any or all sides of the carrier.

In an embodiment, the sleeve assembly may comprise a bushing, a thrust bearing, one or more roller bearings, and/or the like. End cap 26 may be threaded to be removable from the horizontal support, may be retained by a clevis pin, cotter pin, tapered pin, and/or the like. Accordingly, in an embodiment, the sleeve assembly is standardized such that a plurality of carrier and work surface sub-assemblies are interchangeable with one or more suitable horizontal supports according to the instant disclosure.

Figure 9:
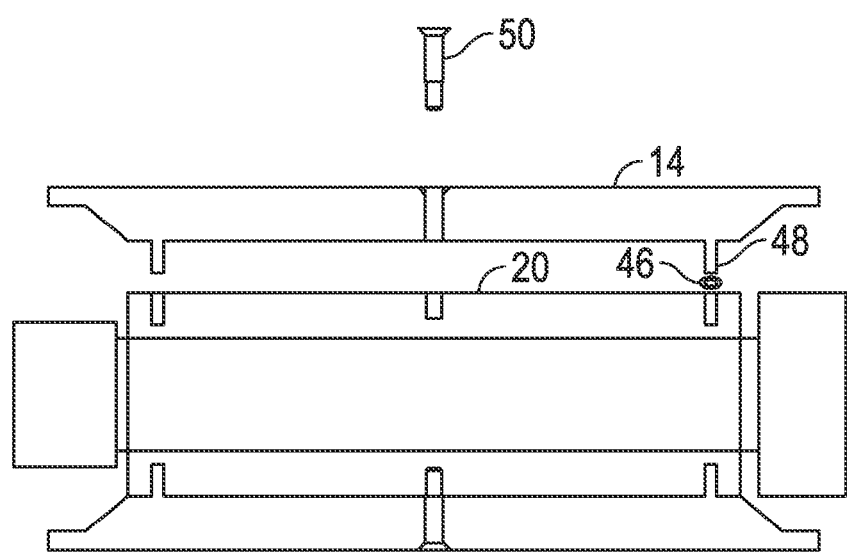
FIG. 9 shows a partially exploded side view of the carrier work surface sub-assembly.
Figure 10A:
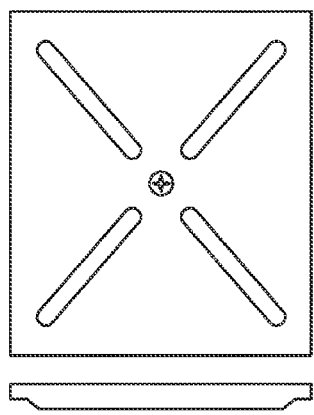
FIG. 10A shows an embodiment of a work surface.
Figure 10B:
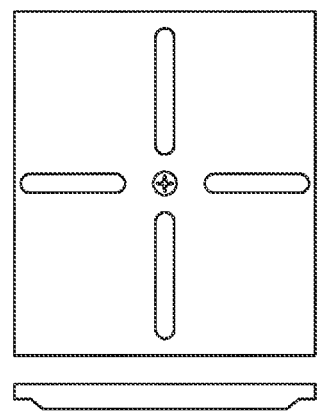
FIG. 10B shows another embodiment of a work surface.
Figure 10C:
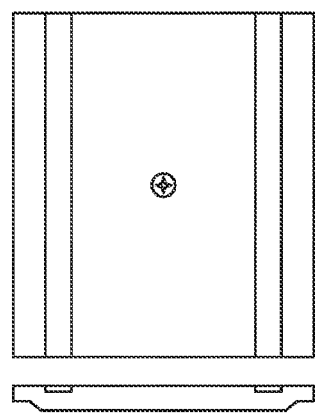
FIG. 10C shows another embodiment of a work surface.
Figure 10D:
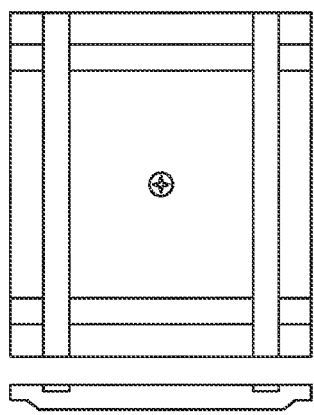
FIG. 10D shows another embodiment of a work surface.
Figure 10E:
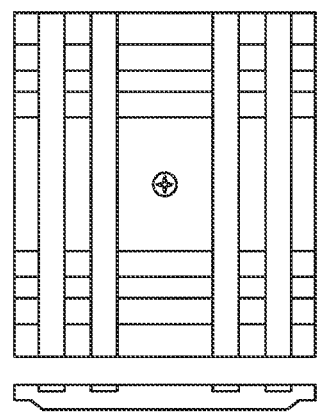
FIG. 10E shows another embodiment of a work surface.

In many applications, such as a drill press table, front to back and side to side leveling of the work surface is absolutely critical. When opposing or multiple side platforms are rotated in position, it is imperative that each side be independently adjustable to achieve a level platform and accommodate for potential variances of the fixture the assembly is mounted to. As shown in FIG. 9, which shows a partially exploded side view of the carrier work surface sub-assembly, in an embodiment, the work surfaces is adjustable independent of the others. Such adjustments are not possible with work surfaces supported by a central support, typical in the art. Accordingly, the instant application provides a substantial improvement over such work surfaces. In an embodiment, the work surfaces are independently leveled by adding one or more spacers or shims 46 between the work surface 14 and the carrier 20. Additional finite leveling can be accomplished by extending and retracting screw inserts 48 that extend through the work surface to contact the carrier 20. The work surface may then be attached to the carrier via a screw 50 or other fastener. Accordingly, the work surface may be attached to the carrier in a plurality of points to allow for adjustment of the work surface and to provide an improved stability in the work surface relative to work surfaces known in the art. In an embodiment, the work surface may be leveled side to side via rotational adjustment of the carrier about the horizontal support and/or by positioning of the horizontal support relative to the vertical support e.g., via rotational adjustment of mounting adapter 210 to positioning mount 13.

As shown in FIGS. 10A-E, the work surface may include any number of holes, slots grooves, and/or the like to facilitate attachment of a tool thereto.

Figure 11:
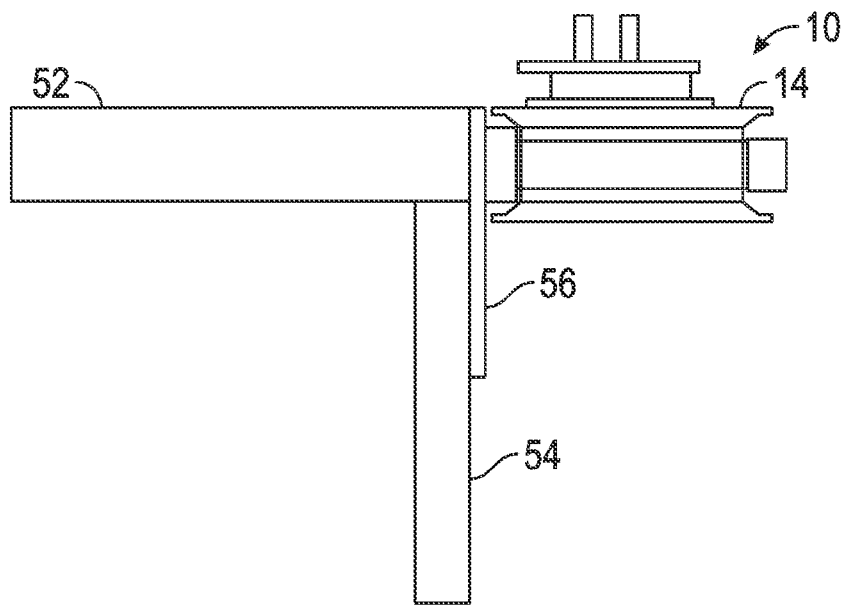
FIG. 11 shows a side-mount assembly according to an embodiment.

FIG. 11 shows a side-mount assembly 56 according to an embodiment. In an embodiment, the assembly 10 may be mounted to a vertical support 54 of a workbench, which may include both the table leg and the workbench top or other components of the table, the workbench having a horizontal top surface 52. In an embodiment, the assembly 10 is mountable to the vertical support 54 such that at least one of the work surfaces 14 is positionable to be coplanar with the horizontal top surface 52.

Figure 12:
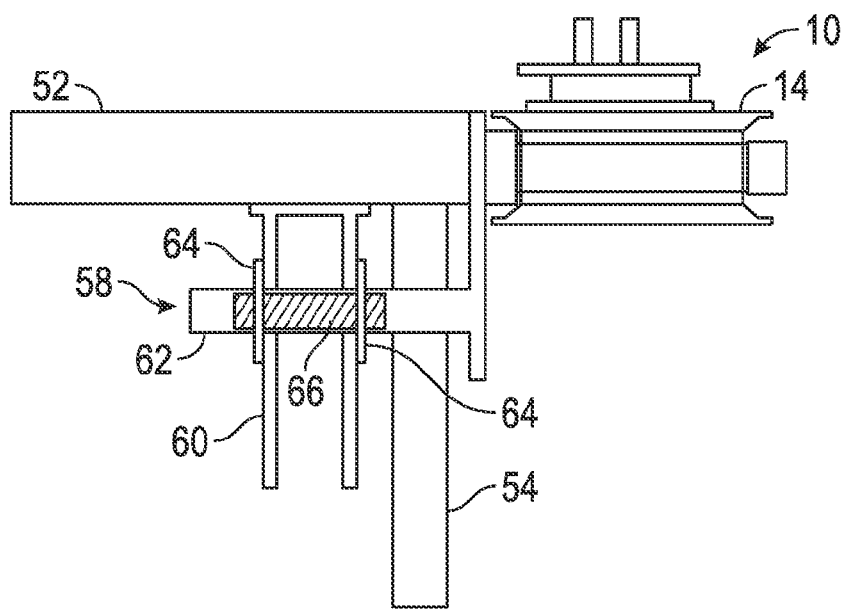
FIG. 12 shows an under table mount assembly according to an alternate embodiment.

FIG. 12 shows an under table mount assembly 58 (i.e., a positioning mount) according to an alternate embodiment. In an embodiment, the vertical support may include a mounting assembly comprising a mounting fork 60 extending away from a surface of the workbench, which is engaged by a corresponding mounting slide 62, e.g., via threaded fasteners 64 around a thread rod 66. The mounting slide 62 may then be adjusted vertically along the mounting fork to position the height of the work surface 14.

Figure 13:
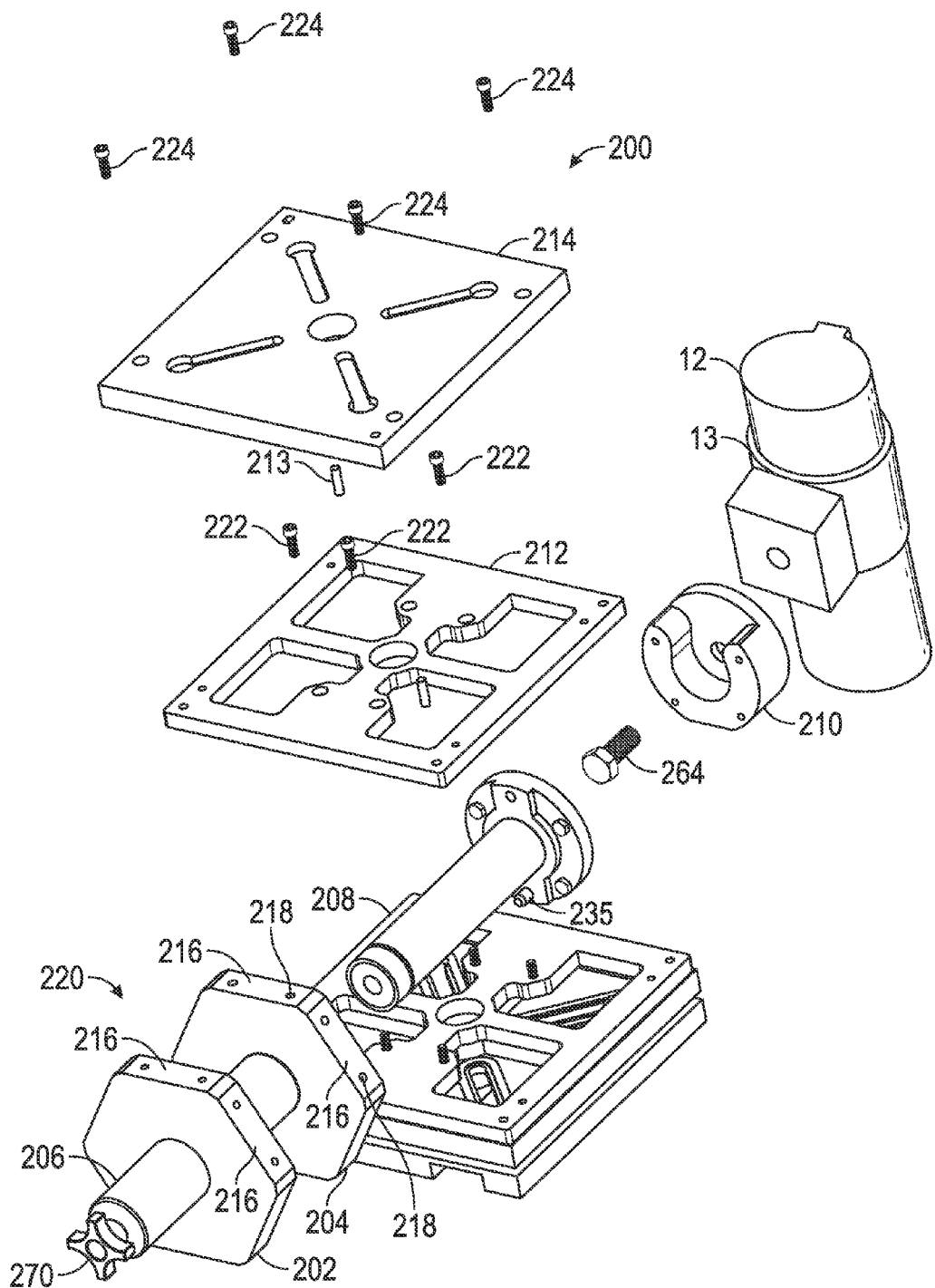
FIG. 13 shows a partially expanded view of an assembly according to an alternative embodiment.
Figure 14:
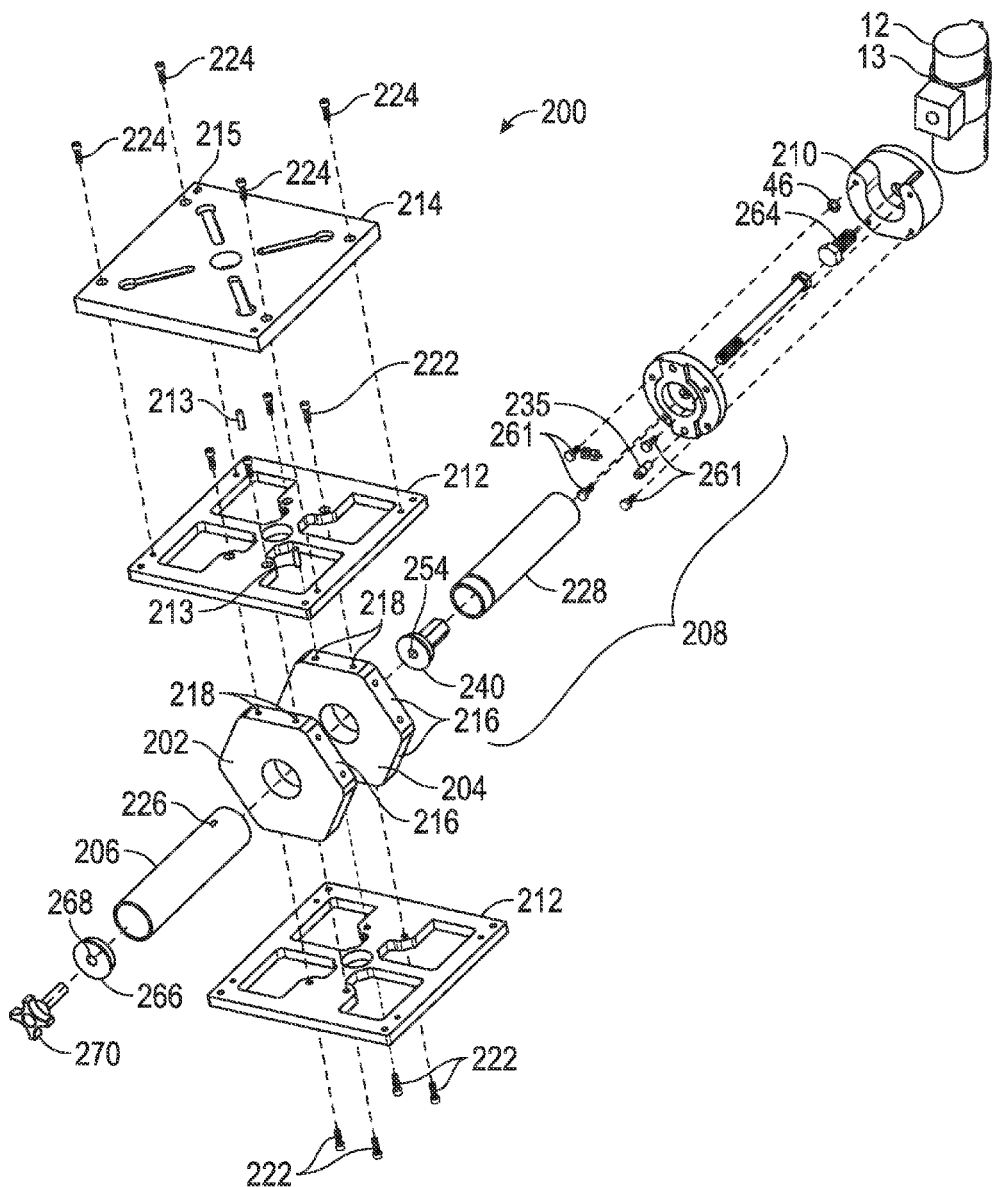
FIG. 14 shows an expanded view of the assembly shown in FIG. 13.
Figure 15:
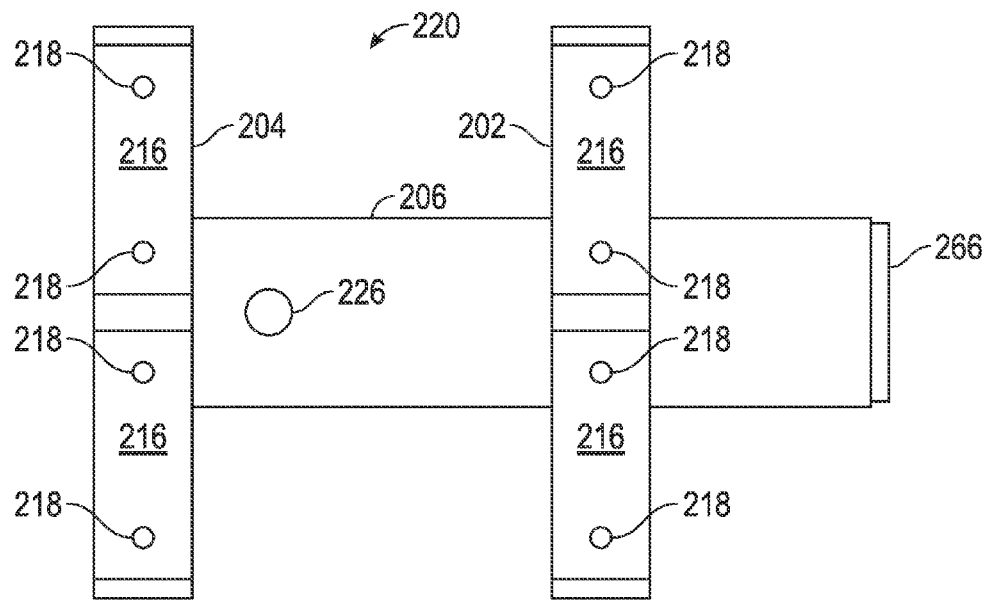
FIG. 15 shows a side view of an embodiment of a carrier of an assembly according to an embodiment.
Figure 16:
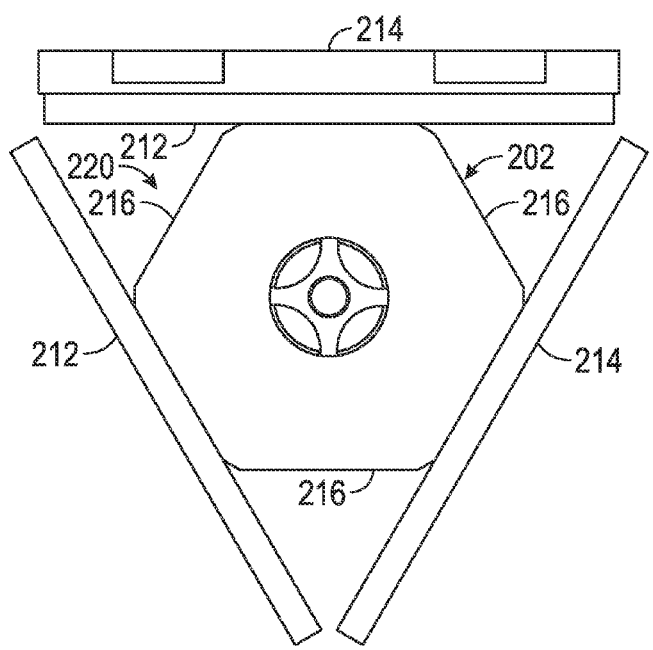
FIG. 16 shows a frontal view of an assembly according to an embodiment.

As shown in FIGS. 13, 14, and 15, in another embodiment according to the instant application, an assembly generally represented as 200, comprises a carrier 220 comprising a plurality of multiple sided mounting plates 202 and 204, each of which is mounted on a sleeve 206 releasably mountable on, and rotatable about, a horizontal support 208; the horizontal support 208 being attachable to a positioning mount 13 disposed on a vertical support 12 e.g., a support column of a drill press, an under table mount, or the like, by a mounting adapter 210. As shown in FIG. 15, in an embodiment, carrier 220 comprises mounting plates 202 and 204, each of which independently comprise a plurality of outer edges or sides 216, two or more of the sides 216 each comprise attachment means, e.g., a plurality of threaded holes 218 disposed therein, each of which are dimensioned and arranged to engage a threaded member 222 which protrudes through one of the work surface mounting plates 212 and/or work surfaces 214 (cf. FIGS. 12 and 16) to engage and attach the work surface mounting plate and/or the work surface to the carrier, such that two or more mounting plates are used to attach the work surface or support to the carrier. In an embodiment, mounting plates 202 and 204 may be press-fit, welded, bolted, or otherwise attached to sleeve 206. In an embodiment, mounting plates may comprise at least 3 sides, 4 sides, or 5 sides, or 6 sides, at least one or at least two of which comprise attachment means 218 dimensioned and arranged therein or thereon to engage one or more work surface mounting plates 212 and/or work surfaces 214. Accordingly, in an embodiment, the work surface 212 or 214 is attached to the carrier by a plurality of mounting plates to provide a more stable work surface which is essentially infinitely adjustable relative to the vertical support. As shown in FIG. 16, in an embodiment, the mounting plates 202 and 204 may have an overall hexagonal shape, allowing for at least three separate mounting plates 212 and/or at least three separate work surfaces 214 to be arranged radially about the horizontal support of the carrier 220, each of which is attached to a plurality of mounting plates at a plurality of points such that the work surface may be adjusted (e.g., leveled) relative to the vertical support.

Figure 19:
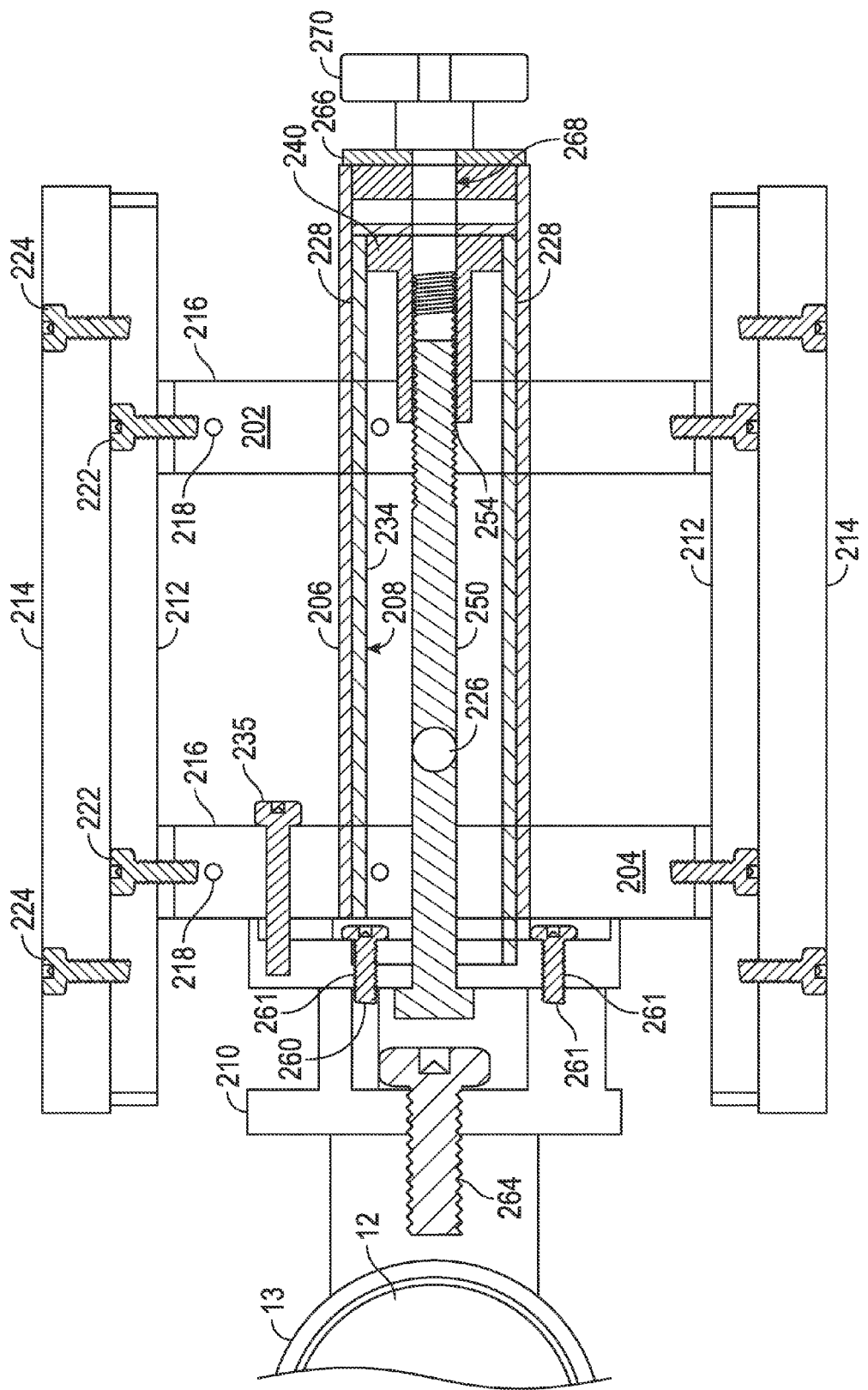
FIG. 19 shows a cross-sectional view of an assembly according to an embodiment.
Figure 22:
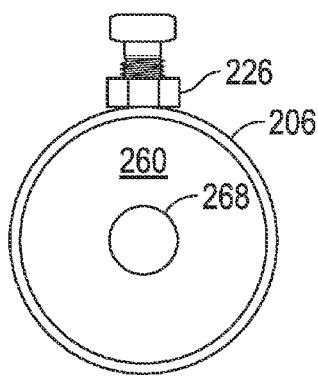
FIG. 22 shows a front view of a sleeve according to an embodiment.
Figure 24:
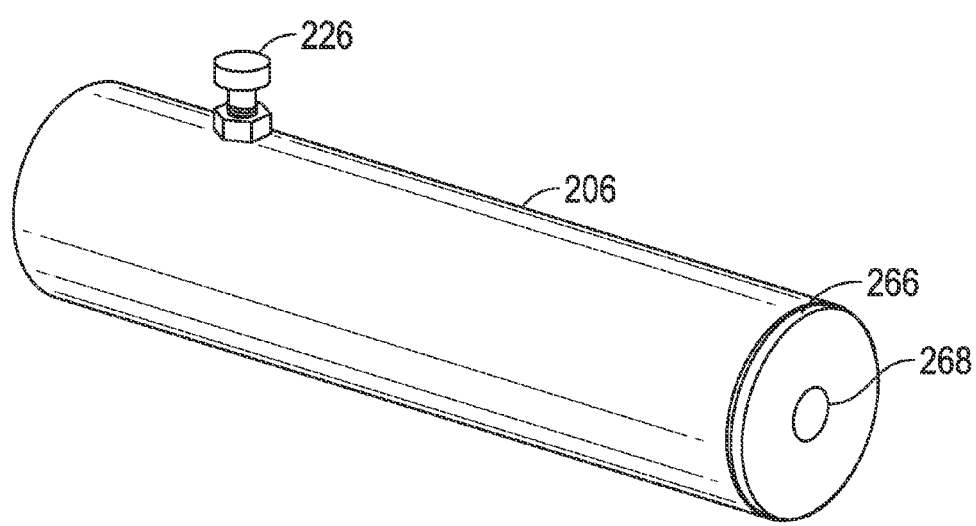
FIG. 24 shows a perspective view of a sleeve according to an embodiment.

As shown in FIGS. 15, 22, and 24, in an embodiment, sleeve 206 may comprise a locking or catch pin 226, which may be biased against the horizontal support 208 to releasably engage a recess 228 disposed in the horizontal support to prevent the unintended removal of the carrier from the horizontal support. As shown in FIG. 19, sleeve 206 may further comprise an end bushing 266 comprising a central hole 268 through which a threaded member of a locking knob 270 may be disposed such that when the sleeve 206 of carrier 220 is mounted on the horizontal support 208, locking knob 270 is dimensioned and arranged to engage a threaded recess of horizontal support 208 (e.g., a threaded recess 254 of the threaded attachment bushing 240 of horizontal support 208), thereby releasably attaching, fixing or locking the carrier 220 to the horizontal support and thus, fixing the carrier relative to the vertical support 12. Accordingly, in an embodiment, the assembly comprises a carrier which comprises a sleeve assembly rotatably disposed about and releasably engaged with a horizontal shaft of the horizontal support. In an embodiment, the sleeve assembly comprises an outer end bushing having a central hole through which a threaded member of a locking knob is disposed, wherein a portion of the threaded member of the locking knob is dimensioned and arranged to engage a corresponding threaded recess disposed in an end of the horizontal shaft proximate to the outer end bushing to releasably attach the carrier to the horizontal support. Rotation of the assembly thus comprises disengaging of the locking knob 270 from horizontal support (e.g., unscrewing the locking knob from the threaded recess 254 of the horizontal support), sliding the carrier away from the vertical support along the horizontal support in an amount sufficient to disengage the locking pin 235 from either the carrier or the mounting flange 236, rotating the carrier to the appropriate position, sliding the carrier towards the vertical support to engage the locking pin 235 between the carrier and the horizontal support, and re-engaging the knob 270 with the threaded recess 254 of the horizontal support.

Figure 25:
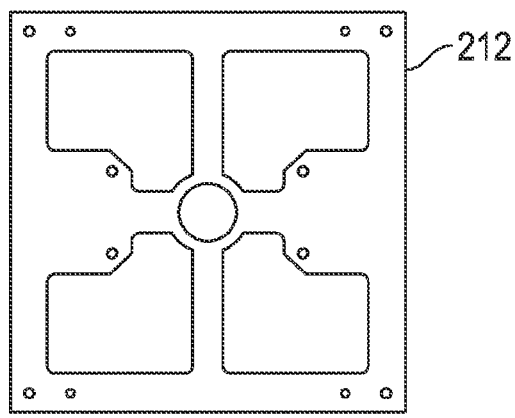
FIG. 25 shows a top view of a work surface mounting plate according to an embodiment.
Figure 26:
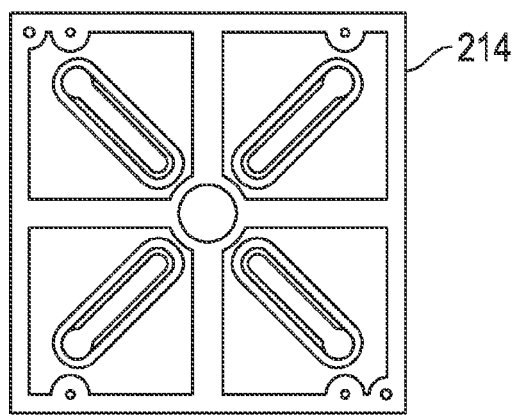
FIG. 26 shows a top view of a work surface according to an embodiment.
Figure 27:
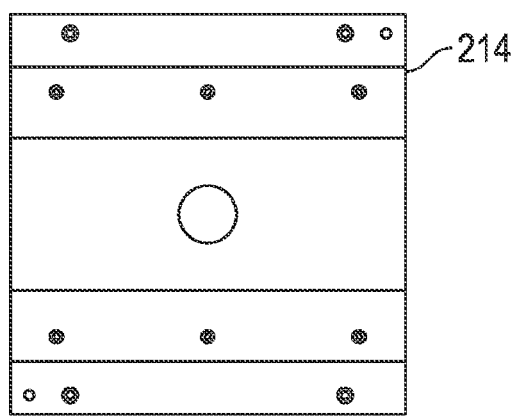
FIG. 27 shows a top view of an alternative work surface according to an embodiment.

As shown in FIGS. 13 and 14, in an embodiment, each work surface mounting plate 212 is attached to supports 202 and 204 via threaded connectors 222 at a plurality of attachment points, and each work surface 214 is attached to a corresponding mounting plate 212, e.g., via threaded connectors 224. As shown in FIG. 16, in an embodiment each work surface 214 may be directly attached to the carrier (i.e., attached to a plurality of supports at a plurality of attachment points. FIG. 25 shows an overhead view of an work surface mounting plate 212, also referred to as attachment plate 212 according to an embodiment of the instant disclosure. In an embodiment, attachment plate 212 may comprise an alignment pin 213 dimensioned and arranged to engage work surface 214 through an alignment hole 215 to assist in positioning the work surface 214 on the attachment plate 212. FIGS. 26 and 27 each show embodiments of a work surface 214 according to the instant disclosure.

FIG. 17 shows a mounting plate 204 comprising a generally hexagonal shape having 6 sides 216 to which a work surface or work surface support may be attached. The mounting plate further comprises a central hole 230 through which the tubular sleeve is arranged. Mounting plate 204 (or 202) may further comprise at least one or a plurality of locking pin holes 232 dimensioned and arranged to allow a locking pin 235 (cf. FIG. 19) to protrude through the mounting plate 204 and into a corresponding recess 256 (cf. FIG. 21A) in the mounting flange 236 (cf. FIG. 20) of horizontal support 208 to lock or otherwise secure the assembly 200 in a particular orientation relative to the vertical support, i.e., to lock a work surface parallel to the vertical support, perpendicular to the vertical support, or at an angle from about 1° to about 89° relative to the vertical support. In an embodiment, a single locking pin 235 is disposed in the recess 256 (cf. FIG. 21A) in the mounting flange 236 (cf. FIG. 20) of horizontal support 208 which engages one of the locking pin holes 232 in the mounting plate 204. In an alternative embodiment, a plurality of locking pins 235 are each disposed in one of a plurality of locking pin holes 232 and engage recesses 256 in the mounting flange 236 (cf. FIG. 20) of horizontal support 208. (to lock or otherwise secure the assembly 200 in a particular orientation relative to the vertical support.

Figure 20:
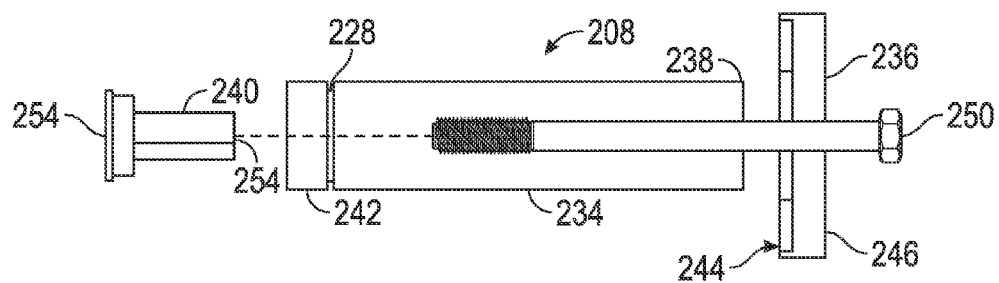
FIG. 20 shows an exploded view of a horizontal support according to an embodiment.
Figure 21A:
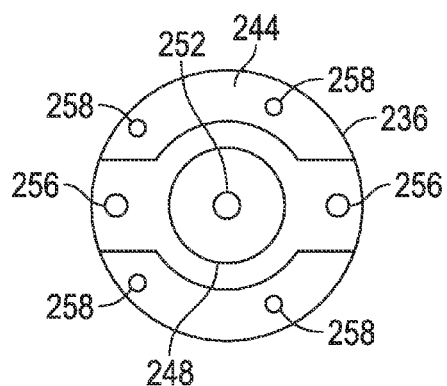
FIG. 21A shows a front view of a mounting flange according to an embodiment.
Figure 21B:
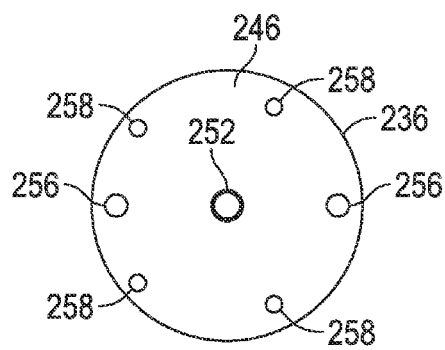
FIG. 21B shows a rear view of a mounting flange according to an embodiment.

As shown in FIGS. 20, 21A and 21B, in an embodiment, the horizontal support 208 may comprise a support shaft 234 attached to a mounting flange 236 on a first end 238, and comprising a threaded attachment bushing 240 disposed in a second end 242 of support shaft 234 located opposite the first end 238. The horizontal support 208 may further comprise recess 228 located proximate to the second end 242. Mounting flange 236 may comprise an assembly side 244 separated from an adapter side 246 of the mounting flange. In an embodiment, the support shaft 234 may be press-fit, welded, or the like into a recess 248 disposed in the assembly side 244 of mounting flange 236. In an embodiment, or in addition to the support shaft 234 being otherwise attached to mounting flange 236, horizontal support 208 may further comprise a threaded member 250 disposed through a central hole 252 located through mounting flange 236 which is dimensioned and arranged to threadedly engage a corresponding threaded recess 254 in the threaded attachment bushing 240 to thereby secure the support shaft 234 to the mounting flange 236.

Figure 23:
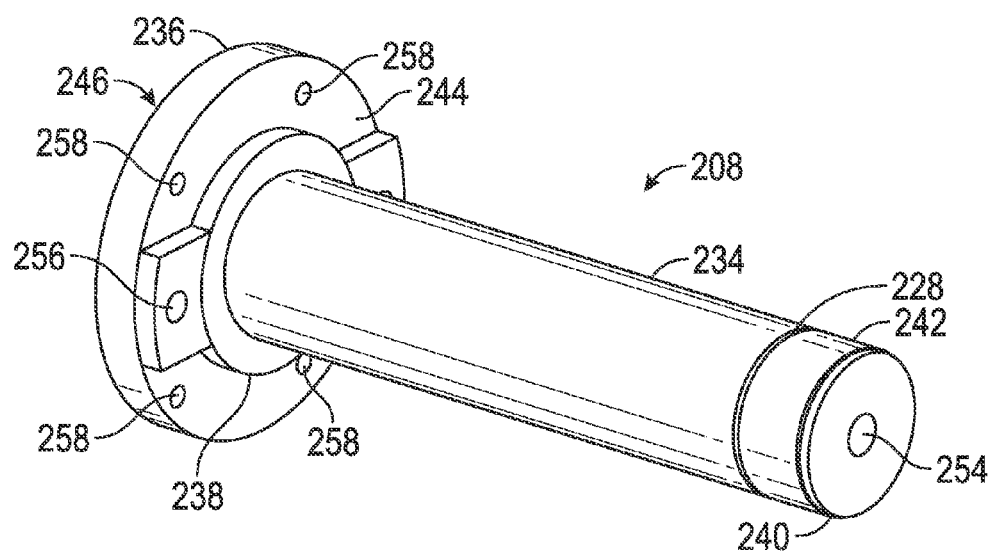
FIG. 23 shows a perspective view of a horizontal support according to an embodiment.

Mounting flange 236 may further comprise one or more locking pin recesses 256 dimensioned and arranged to engage a corresponding locking pin 235 (cf. FIG. 19) disposed through a locking pin hole 232 (cf. FIG. 17) located in mounting plate 204. Mounting flange 236 may further comprise one or more attachment holes 258 dimensioned and arranged to allow each of one or more threaded members 261 to engage a corresponding threaded recess 260 of mounting adapter 210 (cf. FIG. 18A) to attach the horizontal support 208 to the mounting adapter 210. In an embodiment, one or more shims 46 may be placed between mounting flange 236 and mounting adapter 210 to level the work surface relative to the vertical support (cf. FIG. 14). A perspective view of horizontal support 208 is shown in FIG. 23.

FIG. 18A shows a front side of mounting adapter 210 according to an embodiment of the instant disclosure. FIGS. 18B, 18C, 18D, and 18E show an overhead view, a right side view, a left side view, and a bottom view, respectively, of mounting adapter 210. In an embodiment, mounting adapter 210 may comprise a mounting hole 262 disposed therethrough dimensioned and arranged to allow a threaded member 264 to engage and attach mounting adapter 210 and thus assembly 200 to positioning mount 13 disposed on a vertical support 12 (cf. FIGS. 13 and 14).

Figure 28:
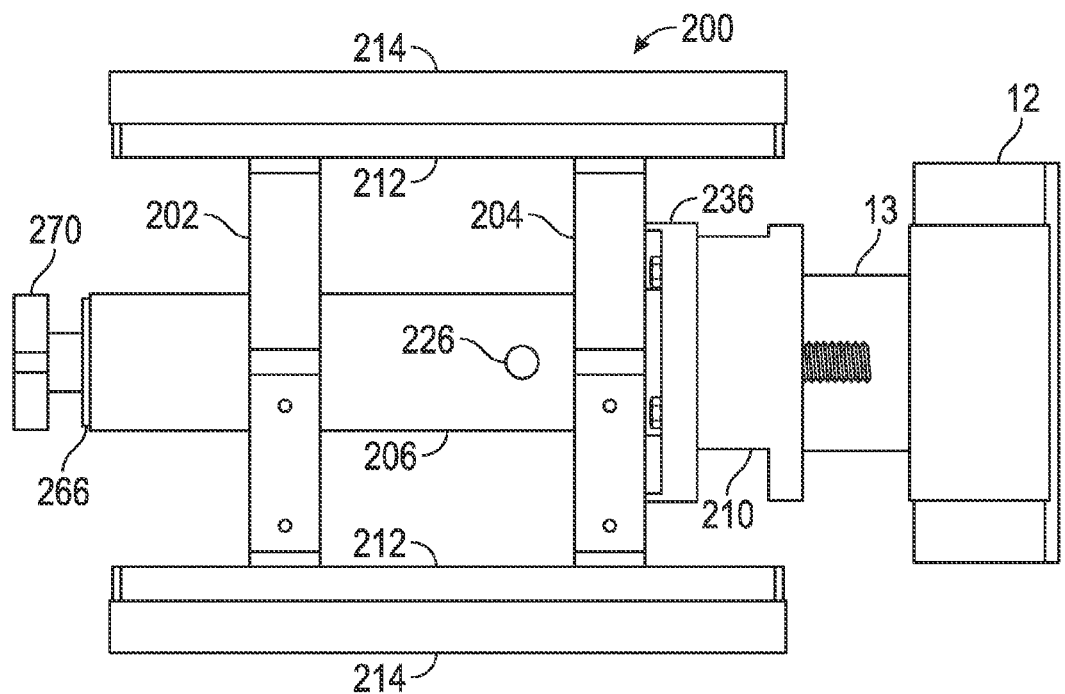
FIG. 28 shows a side view of an assembly according to an embodiment.
Figure 29:
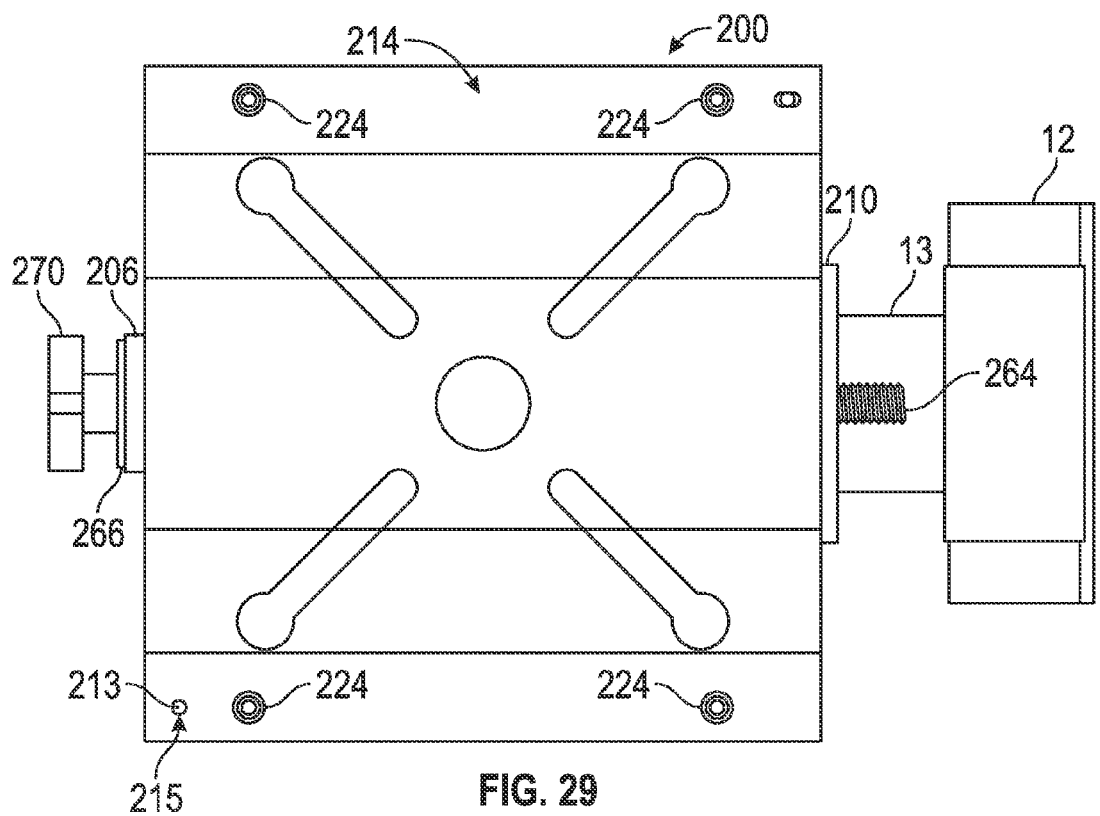
FIG. 29 shows a top view of the assembly shown in FIG. 28.
Figure 30:
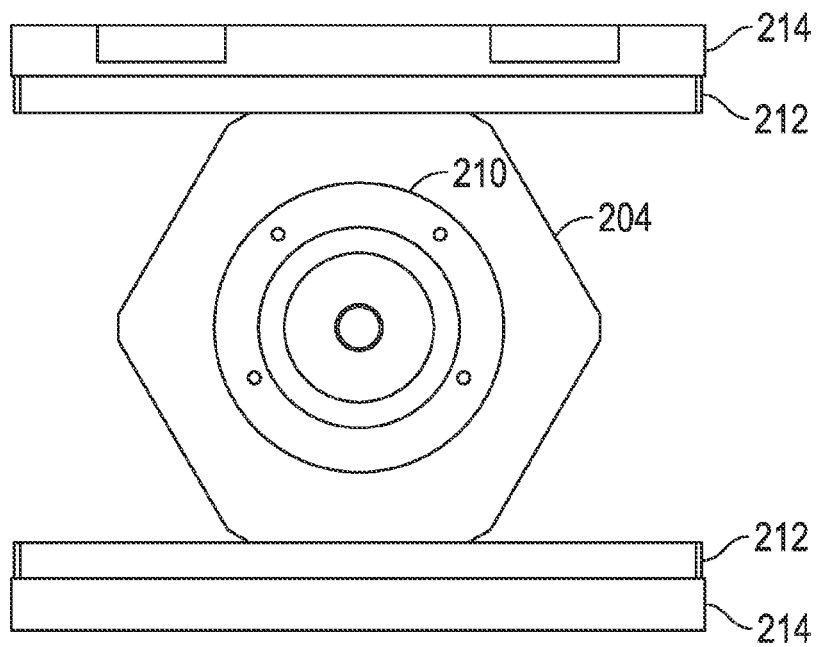
FIG. 30 shows a rear view of the assembly shown in FIG. 28.
Figure 31:
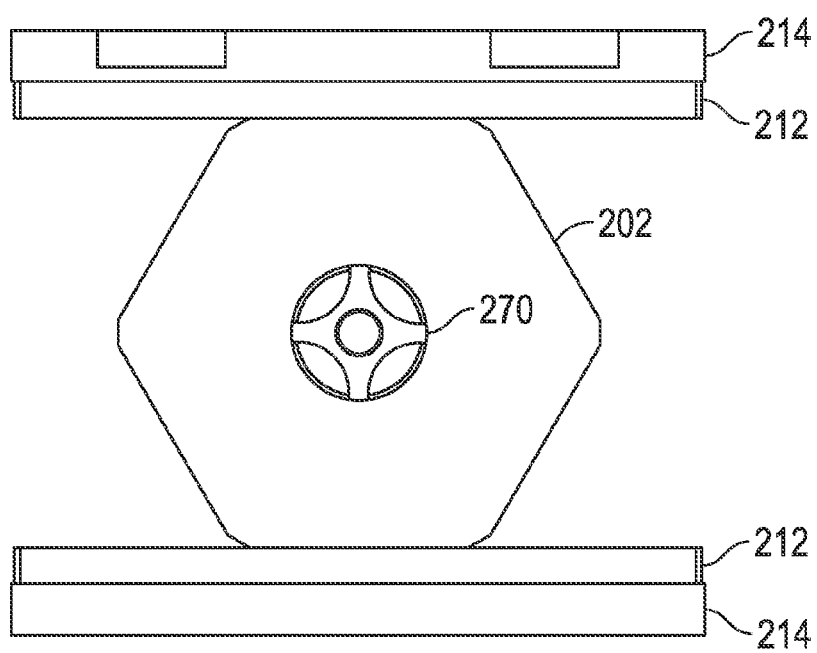
FIG. 31 shows a frontal view of the assembly shown in FIG. 28.

FIG. 28 shows a side view of an assembly according to embodiments disclosed herein. FIGS. 29, 30, and 31 show a top view, a rear view (unattached to the positioning mount), and a front view, respectively, of the assembly shown in FIG. 28.

Figure 32:
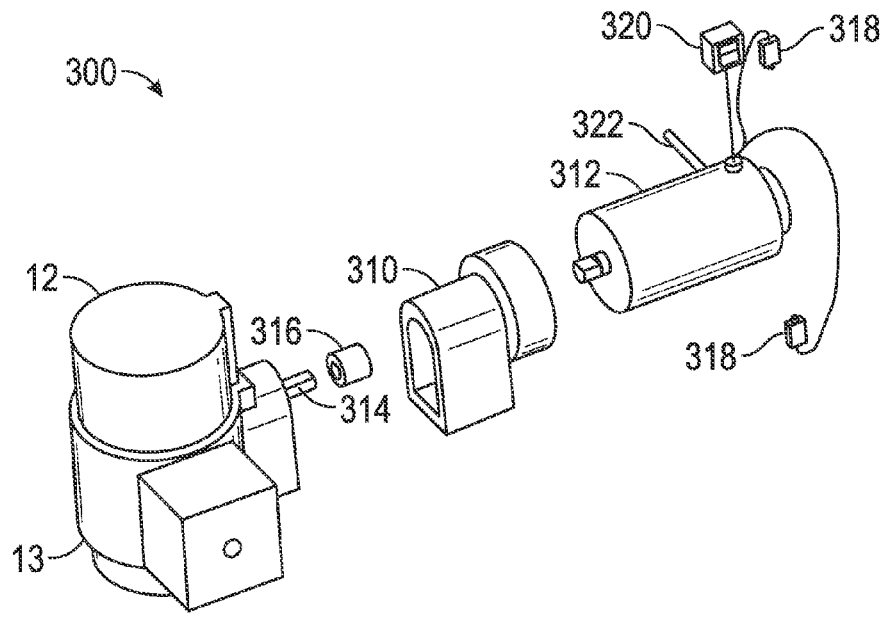
FIG. 32 shows an exploded view of a motor assisted lift according to an embodiment.
Figure 33:
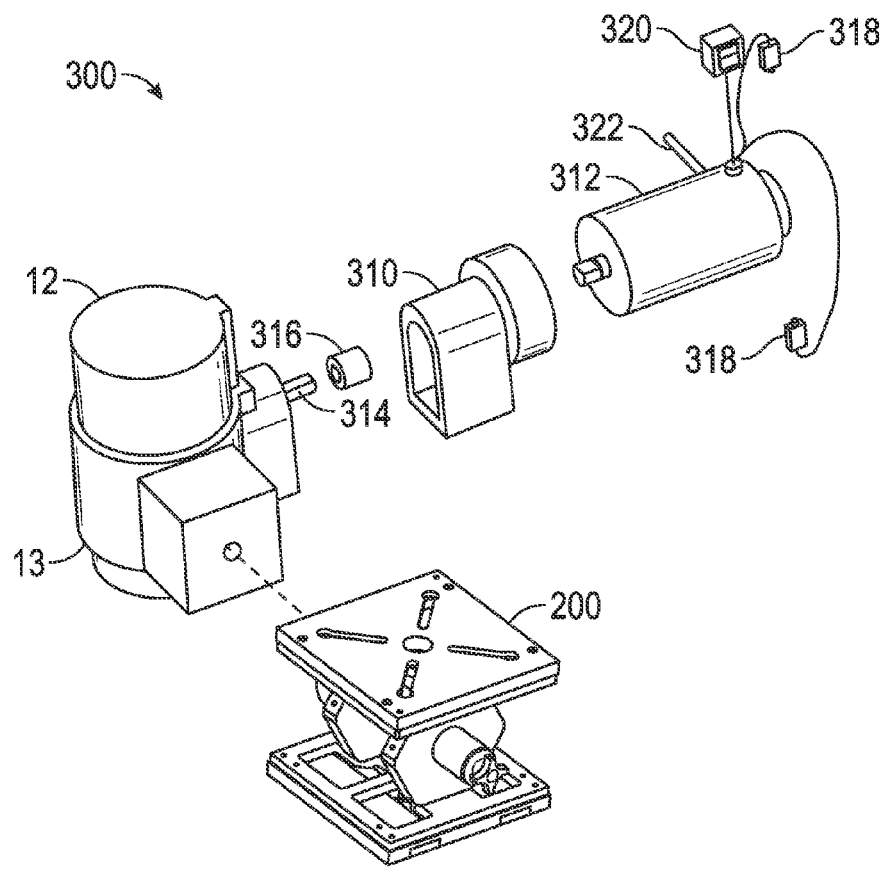
FIG. 33 shows an exploded view of a motor assisted lift in combination with an assembly according to an embodiment.

In an embodiment, as shown in FIG. 32, the assembly may comprise, or may further comprise a motor assisted lift, generally referred to as 300. In an embodiment, the motor assisted lift 300 may comprise a motor adapter 310 which is dimensioned and arranged to be detachably engaged with a positioning mount 13 disposed on a vertical support 12. Motor assisted lift 300 may further comprise an electric motor 312 in electric communication with various controls, e.g., a power cord 322, a variable speed control switch and/or electronic control module 320, and coupled to an input shaft 314 of the positioning mount 13 via a shaft coupler 316. In an embodiment, the electric motor 312 may be in electrical communication with an electronic control module 320 and/or one or more limit switches or positioning sensors 318 placed along vertical support 12 to control the travel of the positioning mount 13 within a particular vertical range, the speed at which the positioning mount is adjusted, allowing for fine-tuning of the position, and/or to prevent damage to the assembly. As shown in FIG. 33, in an embodiment, the motor assisted lift 300 may be used in combination with a positioning mount 13 which is also threadably engaged with any embodiment of an assembly according to one or more embodiments disclosed herein, e.g., 10 or 200, generally represented in the figure as 200. In an embodiment, the motor assisted lift may be dimensioned and arranged to allow retrofit of a drill press by replacement of a manual crank with the motor assisted lift according to embodiments of the instant disclosure.

Figure 34:
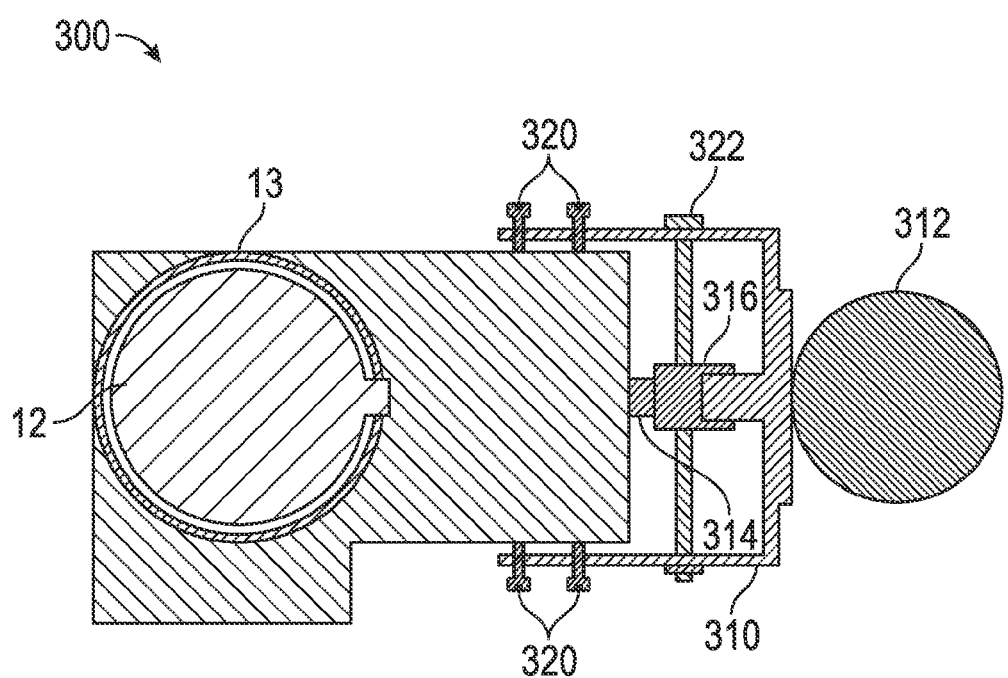
FIG. 34 shows a cross-sectional view of a motor adapter frictionally engaged with the positioning mount according to an embodiment.

As shown in FIG. 34, in an embodiment, the motor adapter 310 may be engaged with the positioning mount 13 via a plurality of set screws 320 and/or via compression of the motor adapter 310 via a compression bolt 322, such that the motor adapter 310 is frictionally engaged with the positioning mount 13.

Embodiments

Accordingly, the instant disclosure provides the following embodiments:

A. An assembly comprising: a plurality of work surfaces each radially arranged about and releasably attached to a carrier at a plurality of attachment points; the carrier releasably engaged with and rotatable about a horizontal support mountable to a positioning mount slidably engaged with a vertical support.

B. The assembly according to embodiment A, wherein the carrier comprises a sleeve assembly disposed about and releasably engaged with a horizontal shaft of the horizontal support.

C. The assembly according to embodiment A or B, wherein the sleeve assembly comprises an outer end bushing having a central hole through which a threaded member of a locking knob is disposed, wherein a portion of the threaded member of the locking knob is dimensioned and arranged to engage a corresponding threaded recess disposed in an end of the horizontal shaft proximate to the outer end bushing to releasably attach the carrier to the horizontal support.

D. The assembly according to any one of embodiments A through C further comprising a locking mechanism for releasably fixing the position of the carrier relative to the horizontal support, and/or further comprising a locking mechanism for releasably fixing the position of the carrier relative to the horizontal support, wherein the carrier is releasably fixable to the horizontal support such that at least one of the work surfaces is perpendicular to the vertical support.

E. The assembly according to any one of embodiments A through D, wherein the vertical support is a support column of a drill press.

F. The assembly according to any one of embodiments A through D, wherein the vertical support is one or more legs or associated components of a workbench comprising a horizontal top surface.

G. The assembly according to embodiment F, wherein the horizontal support is mountable to the vertical support such that at least one of the work surfaces is positionable to be coplanar with the horizontal top surface.

H. The assembly according to any one of embodiments A through G, wherein at least one of the plurality of work surfaces comprises at least one mounting hole, post, slot, groove, or a combination thereof.

I. The assembly according to any one of embodiments A through H, comprising at least two work surfaces attached to the carrier and radially arranged about the horizontal support.

J. The assembly according to any one of embodiments A through I, comprising at least three work surfaces attached to the carrier and radially arranged about the horizontal support.

K. The assembly according to any one of embodiments A through J, wherein at least one of the work surfaces comprises one or more tools attached thereto.

L. The assembly according to embodiments K, wherein the one or more tools is selected from the group consisting of a tool jaw vise, a pipe vise, a hold down clamp, a chain vise, an angular vise, a three-way tilting vise, a milling vice, a toolmakers vise, an X-Y pivot platform, a power saw, a miter saw, a router, a shaper, a sander, a grinder, a planer, and combinations thereof.

M. The assembly according to any one of embodiments A through L, wherein the carrier comprises a plurality of mounting plates radially arranged about a sleeve rotatably engaged with a horizontal shaft of the horizontal support, each of the mounting plates having a generally polygonal shape comprising at least three outer edges, at least two outer edges of each mounting plate comprising at least one attachment point dimensioned and arranged to attach each of the plurality of work surfaces to the carrier at a plurality of attachment points.

N. A motor assisted lift comprising an electric motor dimensioned and arranged to attach to a positioning mount movably engaged about a vertical support, the electric motor coupleable to an input shaft of the positioning mount such that activation of the electric motor causes the positioning mount to move vertically along the vertical support.

O. The motor assisted lift of embodiment N, comprising one or more positioning sensors, switches, or a combination thereof, in electrical communication with the electric motor and arranged to control the travel of the positioning mount within a vertical range.

P. A system comprising an assembly according to any one of embodiments A through M, the motor assisted lift according to embodiments N or O, or a combination thereof Q. A system comprising an assembly comprising a plurality of carriers, each carrier comprising a plurality of work surfaces radially arranged about and attached to the carrier; each carrier releasably engagable with and rotatable about a horizontal support mountable to a vertical support.

R. The system according to embodiment Q, further comprising a motor assisted lift comprising an electric motor dimensioned and arranged to attach to a positioning mount movably engaged about the vertical support, the electric motor coupleable to an input shaft of the positioning mount such that activation of the electric motor causes the positioning mount to move vertically along the vertical support.

S. A method of positioning a workpiece, comprising:
providing an assembly according to any one of embodiments A through M, a system according to any one of embodiments P through R, or a combination thereof attached to a work surface and;
arranging the workpiece on the work surface.

T. A method of positioning a workpiece, comprising:
providing an assembly comprising a plurality of work surfaces radially arranged about and attached to a carrier;
the carrier releasably engaged with and rotatable about a horizontal support mounted on a vertical support; and
arranging the workpiece on the work surface.

U. The method according to embodiment S or T, further comprising rotating the carrier about the horizontal support.

V. The method according to any one of embodiments S through U, further comprising engaging a locking pin between the carrier and the horizontal support to fix at least one of the plurality of work surfaces perpendicular to the vertical support.

W. A method to retrofit a drill press comprising:
providing an assembly according to any one of embodiments A through M, a system according to any one of embodiments P through R, or a combination thereof and attaching the assembly to a position mount of a drill press.

The preceding description has been presented with reference to presently preferred embodiments of the invention. Persons skilled in the art and technology to which this invention pertains will appreciate that alterations and changes in the described compositions and methods can be practiced without meaningfully departing from the principle, and scope of this invention. Accordingly, the foregoing description should not be read as pertaining only to the exact embodiments described and shown in the accompanying drawings, but rather should be read as consistent with and as support for the following claims, which are to have their fullest and fairest scope.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. An assembly comprising:
a plurality of work surfaces radially arranged about a carrier and each work surface releasably attached to the carrier, each work surface comprising a plurality of attachment points;
the carrier releasably engaged with and rotatable about a horizontal support mounted to a positioning mount movably engaged with a vertical support; and
the carrier further comprising a sleeve assembly rotatably disposed about and releasably engaged with a circular cylindrical shaft of the horizontal support;
wherein the cylindrical shaft extends longitudinally from a first end adjacent the positioning mount to a second end;
wherein the sleeve assembly comprises a circular cylindrical sleeve coaxial with the cylindrical shaft and wherein an outer cylindrical surface of the shaft opposes an inner cylindrical surface of the sleeve from an inner end of the sleeve assembly adjacent the first end of the cylindrical shaft to an outer end of the sleeve assembly adjacent the second end of the cylindrical shaft;
a locking mechanism releasably engaging the second end of the cylindrical shaft and the outer end of the sleeve assembly to lock the carrier in axial position relative to the horizontal support;
wherein the carrier comprises a plurality of mounting plates attached to the sleeve and having a generally polygonal shape, wherein the mounting plates are spaced apart from each other and transverse to the sleeve with at least three outer edge surfaces radially arranged about the sleeve; and
threaded members extend through the outer edge surfaces and into the mounting plates below the edge surfaces such that each work surface is attached to at least two spaced-apart mounting plates via the threaded members.

2. The assembly of claim 1, wherein the locking mechanism comprises:
an outer end bushing at the outer end of the sleeve assembly having a central hole; and
a locking knob having an elongated member disposed through the central hole and releasably engaging the second end of the cylindrical shaft to releasably lock the carrier to the horizontal support.

3. The assembly of claim 2, wherein the elongated member is threaded and is received in a threaded recess in the second end of the of the cylindrical shaft.

4. The assembly of claim 1 mounted to a vertical support, wherein the carrier is releasably fixable to the horizontal support such that at least one of the work surfaces is perpendicular to the vertical support.

5. The assembly of claim 1, wherein the vertical support is a support column of a drill press.

6. The assembly of claim 1, wherein the vertical support comprises one or more legs of a workbench comprising a horizontal top surface.

7. The assembly of claim 6, wherein the horizontal support is mountable to the vertical support such that at least one of the work surfaces is positionable to be coplanar with the horizontal top surface.

8. The assembly of claim 1, wherein at least one of the plurality of work surfaces comprises at least one mounting hole, post, slot, groove, or a combination thereof.

9. The assembly of claim 1, wherein at least one of the work surfaces comprises one or more tools attached thereto.

10. The assembly of claim 1, further comprising:
an electric motor attached to the positioning mount;
the electric motor coupled to an input shaft of the positioning mount such that activation of the electric motor causes the positioning mount to move vertically along the vertical support; and
one or more positioning sensors, switches, or a combination thereof, in electrical communication with the electric motor and arranged to control the travel of the positioning mount along the vertical support within a vertical range.

11. An assembly, comprising:
a carrier releasably engaged with and rotatable about a horizontal support mounted at an inner end to a positioning mount slidably engaged with a vertical support;
wherein the horizontal support comprises a circular cylindrical shaft extending longitudinally from a first end adjacent the positioning mount to a second end;
wherein the sleeve assembly comprises a sleeve coaxial with the shaft and wherein an outer cylindrical surface of the shaft opposes an inner circular cylindrical surface of the sleeve from an inner end adjacent the first end to an outer end adjacent the second end;
at least three work surfaces releasably attached to the carrier, each work surface comprising a plurality of attachment points;
a plurality of mounting plates attached to the sleeve, wherein the mounting plates are spaced apart from each other and transverse to the sleeve with outer edge surfaces radially arranged about the sleeve, each of the mounting plates having a generally polygonal shape and comprising at least three outer edge and
a plurality of threaded members for the attachment of each work surface to the carrier wherein the work surfaces are radially arranged about the horizontal support between the first and second ends of the shaft.

12. A method of positioning a workpiece, comprising:
radially arranging a plurality of work surfaces about a carrier;
releasably attaching each of the work surfaces to the carrier, each work surface attached at a plurality of attachment points with a like plurality of threaded members;
releasably engaging a sleeve assembly of the carrier about a horizontal shaft of a horizontal support, wherein the sleeve assembly comprises a sleeve and a bushing, wherein the sleeve and the horizontal shaft are coaxial and the bushing engages the sleeve and an outer end of the horizontal shaft;
wherein the carrier comprises a plurality of mounting plates attached to the sleeve and having a generally polygonal shape, wherein the mounting plates are spaced apart from each other and transverse to the sleeve with at least three outer edge surfaces radially arranged about the sleeve; and
passing the plurality of threaded members through each of the outer edge surfaces and into the mounting plates below the edge surfaces such that each work surface is attached to the plurality of the mounting plates;
mounting an inner end of the horizontal support opposite the outer end on a positioning mount movably engaged with a vertical support;
moving the positioning mount vertically along the vertical support;
rotating the carrier about the horizontal support to position one of the work surfaces perpendicular to the vertical support; and
disposing the workpiece on the perpendicularly positioned work surface.

13. The method of claim 12, further comprising engaging a locking pin between the carrier and the horizontal support to fix the work surface perpendicular to the vertical support.

14. The method of claim 12, further comprising coupling an electric motor to an input shaft of the positioning mount and activating the electric motor to move the positioning mount vertically along the vertical support.

15. The method of claim 14, further comprising connecting one or more positioning sensors, switches, or a combination thereof, for electrical communication with the electric motor to control the movement of the positioning mount along the vertical support within a vertical range.

* * * * *